United States Patent [19]

Albersdoerfer

[11] Patent Number: 4,851,849
[45] Date of Patent: Jul. 25, 1989

[54] INTERROGATION-ANSWERING SYSTEM WITH A PRIMARY RADAR

[75] Inventor: Otto Albersdoerfer, Tutzing, Fed. Rep. of Germany

[73] Assignee: Siemens Aktiengesellschaft, Berlin and Munich, Fed. Rep. of Germany

[21] Appl. No.: 523,002

[22] Filed: Nov. 11, 1974

[30] Foreign Application Priority Data

Nov. 9, 1973 [DE] Fed. Rep. of Germany ..... 23560647

[51] Int. Cl.⁴ .............................................. G01S 13/87
[52] U.S. Cl. ...................................... 342/43; 342/201
[58] Field of Search ............ 343/6 R, 6.5 R, 17.2 PC; 342/42, 43

[56] References Cited

U.S. PATENT DOCUMENTS

| 2,595,141 | 4/1952 | Herbst | 343/6 R |
| 3,108,275 | 10/1963 | Chisholm | 343/6.5 R X |
| 3,243,801 | 3/1966 | Bell et al. | 343/6 R |
| 3,312,970 | 4/1967 | Bond | 343/6 R |
| 3,755,811 | 8/1973 | Breckman | 343/6.5 R |
| 3,956,747 | 5/1976 | Leypold et al. | 342/43 |
| 3,997,897 | 12/1976 | Brunner et al. | 342/43 |

Primary Examiner—T. H. Tubbesing
Attorney, Agent, or Firm—Hill, Van Santen, Steadman & Simpson

[57] ABSTRACT

An interrogation-answering system is employed in conjunction with a primary radar wherein a single joint transmitter is utilized both for generating the interrogation signals and the simple primary radar signals.

16 Claims, 4 Drawing Sheets

INTERROGATION-ANSWERING SYSTEM WITH A PRIMARY RADAR

BACKGROUND OF THE INVENTION

1. Field of the Invention

The invention relates to an interrogation-answering system in connection with a primary radar, whereby an interrogation station transmits interrogation signals with a certain interrogation code, which signals are answered by an answering station with a certain answering code.

2. Description of the Prior Art

For the utilization with primary radar devices it is know to make use of the so-called pulse compression (Skolnik "Radar Handbook", 1970, Chapter 20-2 to 20-36). The echo signals, which are received by the reflection from a target, are subjected to an auto-correlation and result in amplified echo signals corresponding to the compression factor. In detail, the coding of the transmitting signals is performed by frequency or phase modulation and the compression networks are designed in accordance with the kind of modulation used at the transmitting end.

Experiments have become known (Electronic Engineering, July 1961, page 416, as well as in the "Proceeding of the IEE", Vol 112, No. 5, May 1965, pages 861 and 862) in which cases the interrogation signals for a transponder were transmitted by the primary radar transmitter. During the "Interrogation" by the primary radar transmitter, a single pulse is transmitted while the answering signals were coded in a corresponding pulse succession. Due to the lack of the possibility of a selective coding in generating the interrogation signal in the primary radar transmitter and due to the therewith connected undesired starting of answering signals by other primary radar devices which were not at all connected to the respective system, these proposals were considered unsuited and were not further pursued.

In combined primary and secondary radar systems, a special transmitter for the primary radar device and a special transmitter for the secondary radar device is always provided. This results in great expenditures which are not reasonable, particularly not for smaller or mobile systems.

SUMMARY OF THE INVENTION

The invention is based on the task to reduce the effort and expenditure at the transmitting end in interrogation-answering systems in connection with a primary radar. According to the invention this is achieved with a system of the initially mentioned kind in that for the production of interrogation signals and for the production of simple primary radar transmitting systems a single joint transmitter is provided.

Since for this only one single transmitter is required, the effort and expenditure can considerably be reduced. A further advantage consists in that the otherwise resulting difficulties in the differentiating between signals on the one hand and primary radar-transmitting signals on the other hand are at least partially eliminated since only one single high-frequency source is modulated. An improvement of the jamming resistance is effected even for the interrogation signals due to the utilization of the relatively high power primary radar transmitting signals. Beyond this, a reduction of the reaction time of the system frequently occurs.

The above metioned advantages are particularly important for systems requiring small and easily serviceable devices. This applies in particular to devices for mobile use as well as for devices which are to be employed only in a certain very short range (VSR) such as, e.g. combat field radar-identifying systems (very short range-identifying systems).

A preferred embodiment of the invention is that only coded interrogation signals are transmitted, that the echo signals, which return to the interrogation station due to passive reflection, are subjected to an autocorrelation (pulse compression) in a special primary radar receiver as a cause of the interrogation code which is used and also known there, and that the thus obtained autocorrelation pulses are used for the passive position finding in the manner of primary radar technique. During this, only a single transmission signal is now transmitted which permits the carrying out of the passive detection as well as the interrogation. Due to the application of pulse compression in the primary radar receiver, not only a high safety against jamming can be achieved by way of a correspondingly combined output signal but in addition to this even the requirements as regards the structure and combination (coding) of the interrogation signal, which usually cannot easily by fulfilled simultaneously, can be met to a great extent.

BRIEF DESCRIPTION OF THE DRAWINGS

The invention as well as embodiments of the invention are explained in detail by the drawings.

DESCRIPTION OF THE PREFERRED EMBODIMENT

Figure 1:
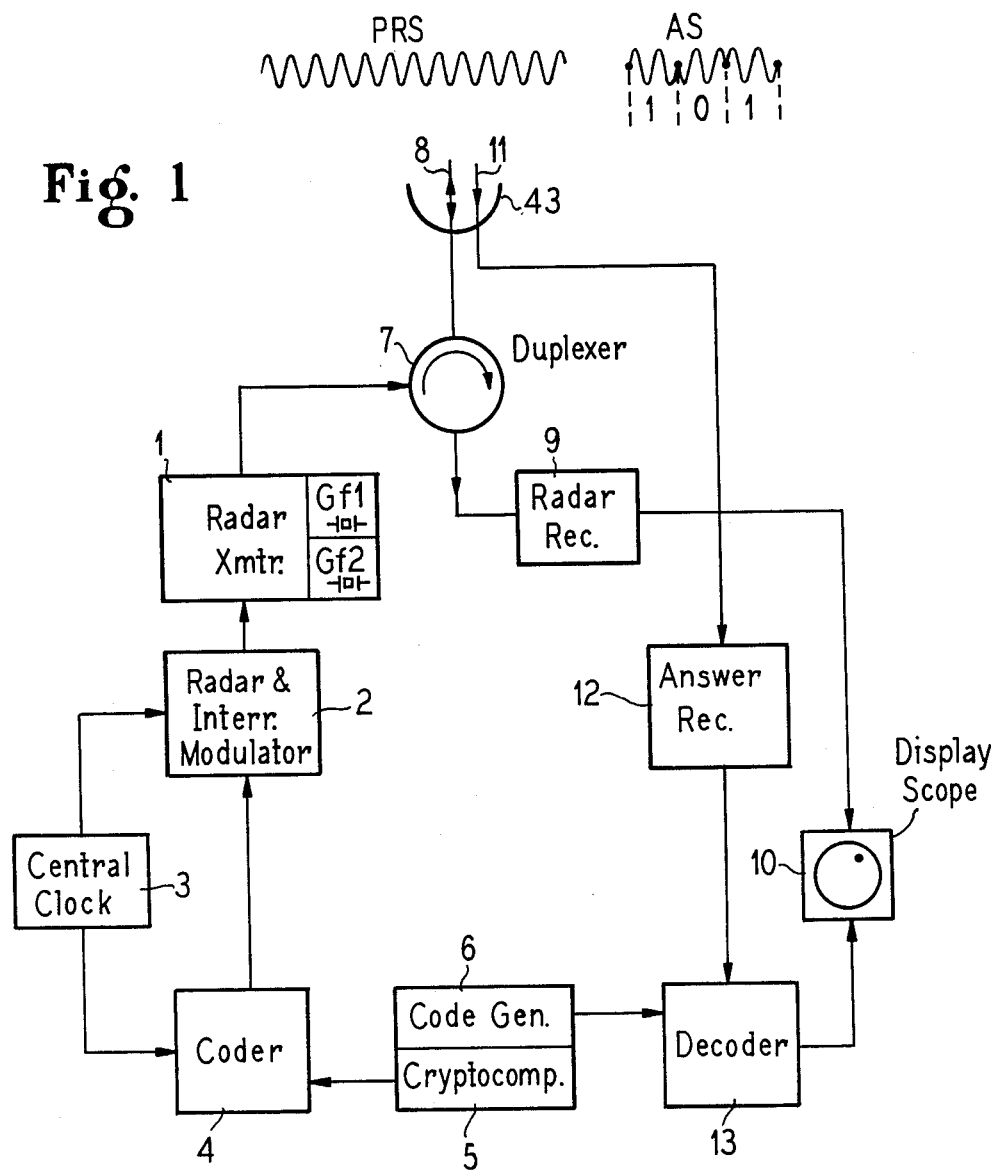
FIG. 1 shows the block circuit diagram of a transmitting station according to the invention.

In the block circuit diagram according to FIG. 1 the radar transmitter is designated with 1. The associated modulation device 2 is controlled from the central timing station (clock) 3 and produces modulation functions of the desired kind as it is described in detail in the further explanations. For the creation of specific interrogation codes, a coder 4 is provided which is supplied with the necessary information by a crypto computer 5. The crypto computer 5 is necessary when a consecutive variation of the interrogation codes shall be carried out to a certain, preferably statistic, distribution. For this purpose the crypto computer 5 is connected with a code generator 6 which may have, e.g., the form of a normal counter. The counting signals of the couter 6 are adulterated by the crypto computer 5 in a certain manner and are thus no longer reproducible for an outsider. The means for accomplishing this are described, e.g., in the U.S. Pat. application Ser. No. 385,593, filed July 23, 1973. In the case of transmission, the coded interrogation information, which is supplied by the code generator 6 to the coder 4 via the crypto computer 5, arrives at the modulator 2, whereby the emission of the modulation via the transmitter 1 is controlled by the central timing station 3 in a certain manner. The transmitting signals arrive at a duplexer 7 and are radiated via an antenna arrangement 8. The emitted transmission signals may have, for instance, the form which is illustrated next to the antenna and they may consist of a first independent signal PRS in form of an uncoded continuous frequency signal which serves for the passive position finding. The transmission signal is received after a reflection via the antenna 8 and is supplied to the primary radar receiver 9 via the duplexer 7. The echo signal is processed here in a known manner and is supplied to an evaluation or indicator system, respectively, which is illustrated here as display scope 10. At some interval before or after the primary radar transmission signal PRS, the interrogation signal AS is transmitted which is coded corresponding to the desired interrogation. In the present example a phase coding with a distribution 1 0 1 is assumed.

It is advisable to transmit the interrogation signal AS ahead of the primary radar transmission signal PRS since then, the emission of the interrogation signal AS lies in the receiver dead-time of the radar receiver 9. By way of this, the receiver 9 can be switched over to reception immediately after the termination of the primary radar transmission signal PRS which is of particular importance for very short range-radar devices.

The transmission of the signals PRS and AS may take place on different or on the same carrier frequencies. The utilization of different carrier frequencies has the advantage that the interrogation signals on the one hand and the primary radar transmission signals on the other hand can be differentiated from one another as regards their frequency which facilitates the processing in many cases. Details of this are explained in connection with FIGS. 6 to 8 where a specific example of the utilization of signals having different frequencies for PRS and AS is illustrated. In the case that signals of different frequencies are transmitted, two frequency generators Gf1 and Gf2 have to be provided in the radar transmitter 1, which frequency generators are alternately activated for forming a primary radar transmission signal PRS or of an interrogation signal AS, respectively. In this context it may also be advantageous to derive the respective transmission signals PRS and AS from one joint base generator by correspondingly variable multiplication factors.

Answer signals which are transmitted by an answering station (e.g. a transponder) as a cause of the interrogation signal AS arrive at a responsor 12 via its own antenna 11. The utilization of a special antenna 11 is justified when the answer signals arrive on a considerably different frequency than the transmission signals PRS or AS, respectively. The two antennas 8 and 11 may be provided with a joint reflector 43 which means that they may form a so-called integrated antenna system. From the responsor 12 the answer signals come to a decoder 13 which checks the answer signals to ascertain whether they arrive with the correct answering code. If a timewise continuous change of the interrogation code is provided, the answer codes also have to be changed successively in most cases in accordance with a certain program. Such systems are described for example in the German Pat. No. 1,946,247, German Offenlegungsschrift 2,005,457 and 2,005,471 or in the U.S. Patent application Ser. No. 385,593, filed July 23, 1973. In this case, the code generator 6 has to report the program of the interrogation signals also to the decoder 13. The response information obtained in this manner is supplied to the joint evaluation or indicator system, respectively. in the present example to the display scope 10 and there, it is displayed or processed, respectively, in the common fashion.

Figure 2:
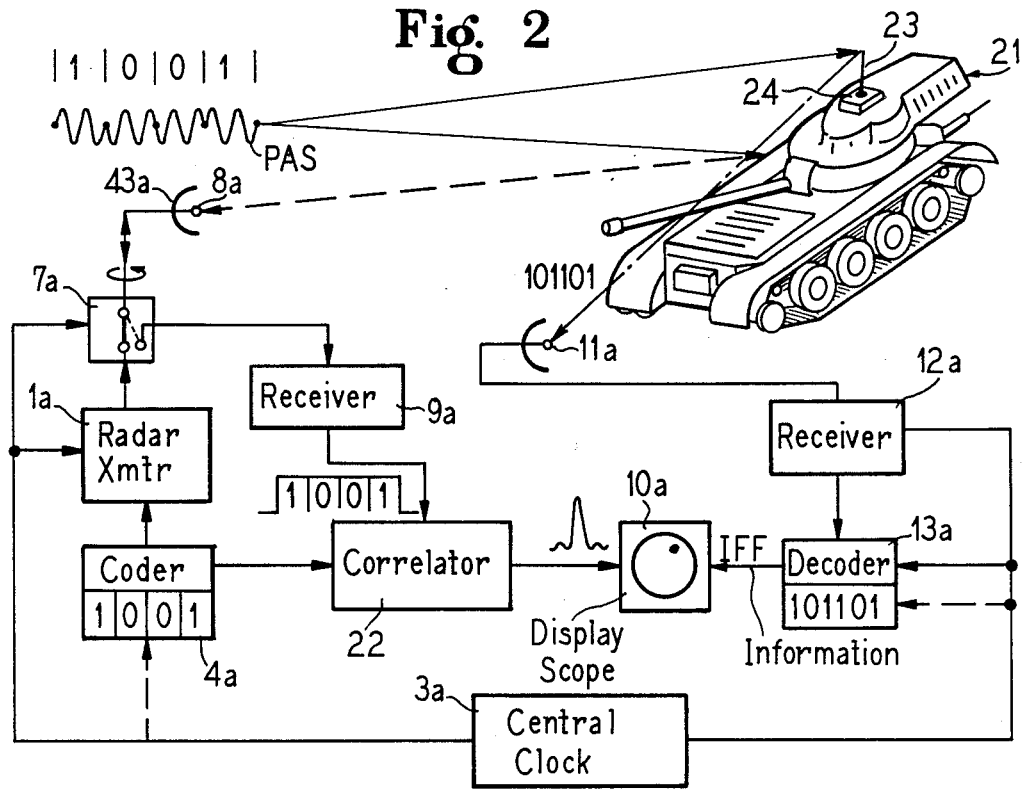
FIG. 2 shows the block circuit diagram of a complete interrogation-answering system.

In FIG. 2, a complete interrogation-answering system is illustrated in which only a single signal is emitted from the interrogation station, which signal serves at the same time as the secondary radar transmsission signal and as interrogation signal.

The transmitting end of the illustrated arrangement is largely identical with the arrangement according to FIG. 1. This applies in particular to the coder 4a, the transmitting-receiving switch (duplexer 7a, the—preferably rotating or pivotable—transmitting antenna 8a with the reflector 43a, the central timing station 3a and the primary radar receiver 9a. However, the transmitter 1a is not alternately scanned in order to produce primary radar transmission signals and interrogation signals. In contrast to FIG. 1 only a single signal PAS is emitted which is coded as interrogation signal and which has e.g. the combination keying 1 0 0 1. The coding may take place in a known manner, e.g. by phase-shift keying, frequency-shift keying, etc.

The transmission signal PAS emitted in this way is passively reflected on reflecting objects, e.g. a vehicle 21, and it returns to the antenna 8a as echo signal illustrated with broken lines. The transmitting-receiving switch 7a is switched to reception and supplies the echo signal to the primary radar receiver 9a. At the output of the primary radar receiver 9a a signal is present which corresponds in its combination to the transmission signal PAS. This signal is subjected to autocorrelation (pulse compression) for which the correlator 22 is used. This correlator is supplied with information from the coder 4a containing the coding of the transmission signal PAS so that the auto-correlation can be effected in a known manner. As a result of this it becomes possible to effect from time to time a change of the interrogation code at the transmission signal PAS as well, in order to oppose jamming factors. The correct correlation signal is thus always available for the correlator 22. The combined output signal of the correlator 22 is supplied to the evaluation and indication system, e.g. the display scope 10a and there it is processed in a known manner. Due to the autocorrelation of the passive echo signal, the signal to noise ratio considerably increased and a strong information signal is produced.

The transmitted signal PAS also arrives at an antenna 23 of a transponder 24 which is provided at the vehicle 21. There is also the possibility to set up individual transponders or to hand them over to e.g., a person. The interrogation signals PAS are decoded by the transponder 24 in a manner common with secondary radar devices (transponders). Following this, an answering signal is emitted which may be provided with a correponding information, which also takes place in a coded manner. The answering signal of the transponder 24, which is marked with a dot-dash line and lines, is coded for example in the form 1 0 1 1 0 1 and is received by the receiving antenna 11a in the zone of the interrogation station. The answering signal at decoder 13a is decoded in a known manner after traversing the receiver 12a.

After the decoding, the correponding information, e.g. a friend-foe identification (IFF), is fed to the indicator 10a and is processed there. In the case of a timewise successive change of the answering code, the code for comparison, which is available to the decoder 13a for decoding has to be changed as well which may take place in the same manner as in the case of the code word of the coder 4a, e.g. by control pulses of the central timing station 3a or by a special clock.

A particularly advantageous construction is that the transmitter 1a for the interrogation signals, and the receivers 9a, 12a for the passive echo signals and the active answering signals are combined in one unit.

Figure 3:
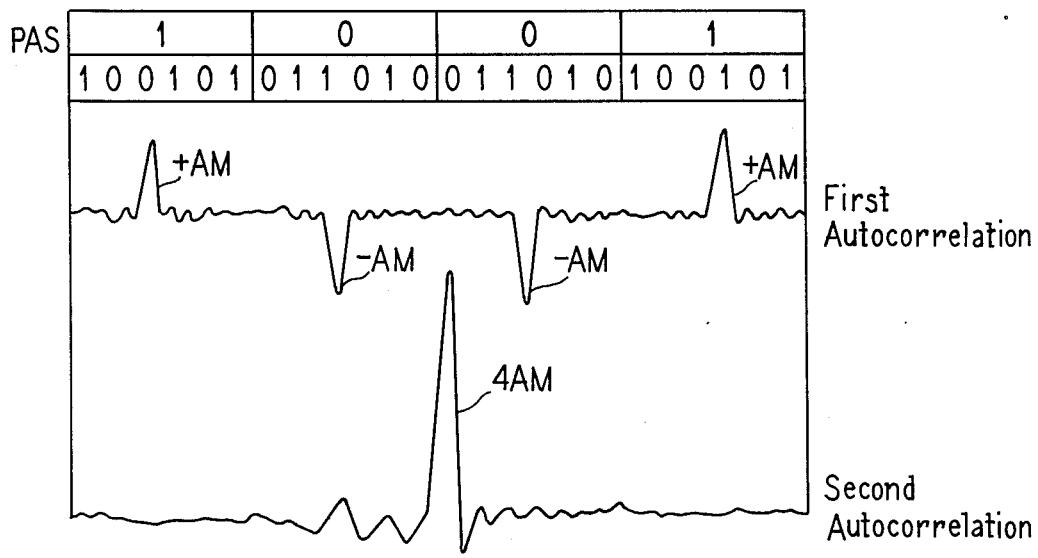
FIG. 3 shows details of the correlation on the basis of certain interrogation signals.

In FIG. 3 top, the keying of the transmission signal PAS according to FIG. 2 is reproduced which has the form 1 0 0 1. In such cases in which these 4 bits of the transmission signal PAS are not sufficient for an autocorrelation at the primary radar receiver or for the interrogation, an entire code word can be assigned to each one of these 4 bits of PAS. More details to this are described in the German Letters Patent No. 1,260,565. The code word for the first bit "1" of the transmission signal PAS can be chosen at random at first and may have, for example, the combination 1 0 0 1 0 1 illustrated therebelow. The selection of these code words should preferably take place in such a way that possibly no, or only slight secondary lobes result during the autocorrelation. The bit representing a "0" at the interrogation signal PAS is reproduced by a code word of the same length, whereby "0" and "1" are exchanged within said first code word. Accordingly, the code word for the "0" reads 0 1 1 0 1 0. Altogether, the actually transmitted signal has thus a form as it is illustrated in the second line of FIG. 3. It consists of 24 single elements and thus makes possible a correspondingly great pulse compression.

In the case of a first autocorrelation in one and the same correlator, each of these code word results in a main lobe which supplies for the code word 1 0 0 1 0 1 a positive primary peak +AM and for a code word 0 1 1 0 1 0 a negative primary peak −AM or vice versa. As a result of a prior art inversion at the negative primary peaks −AM, a single primary peak of (theoretically) 4AM results when a second autocorrelation is carried out. The autocorrelation is thus executed in two steps.

Figure 4:
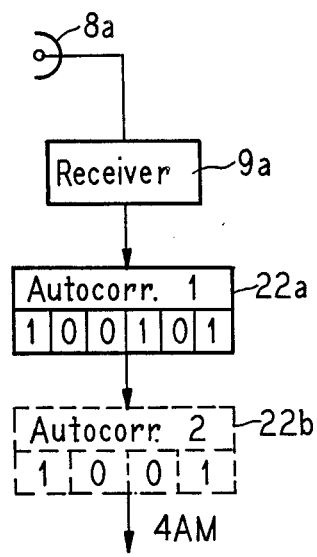
FIG. 4 shows in the block circuit diagram an arrangement for the execution of the correlation according to FIG. 3.

FIG. 4 illustrates a circuit diagram for such a two-stage autocorrelation. From an antenna, e.g. 8a, the radar receiver 9a is supplied with the coded signals which are received after a passive reflection. Each one of the four code words is separately correlated (correlation function 1 0 0 1 0 1) in a first autocorrelation 22a, and the primary peaks ±AM result. A subsequently connected second correlator 22b, which autocorrelation function reads 1 0 0 1, supplies a single primary peak. This primary peak can then be supplied to the indicator 10a according to FIG. 2.

Instead of a two-stage autocorrelation, also a one-stage correlation with the correlation function of the second line of FIG. 3 is possible (at least with the primary radar receiver 9a).

Since the responsor 24 (FIG. 2) responds only to the interrogation code 1 0 0 1, an autocorrelation according to the first autocorrelation 22a is advantageously effected here as well. The output signals +AM (corresponding to a "1") and −AM (corresponding to a "0") which were obtained in this manner can then be decoded as the interrogation signal 1 0 0 1 and are answered. Since in this case, in contrast to prior art secondary systems, a first auto-correlation is carried out prior to the decoding, an improvement of the signal to noise ratio is possible even in the responsor.

When selecting the coding for the interrogation signals, one should proceed in such a way that the total number of bits forming the interrogation signal is chosen in such a way that the necessary signal to noise ratio is achieved on the basis of autocorrelation for the desired range.

Figure 5:
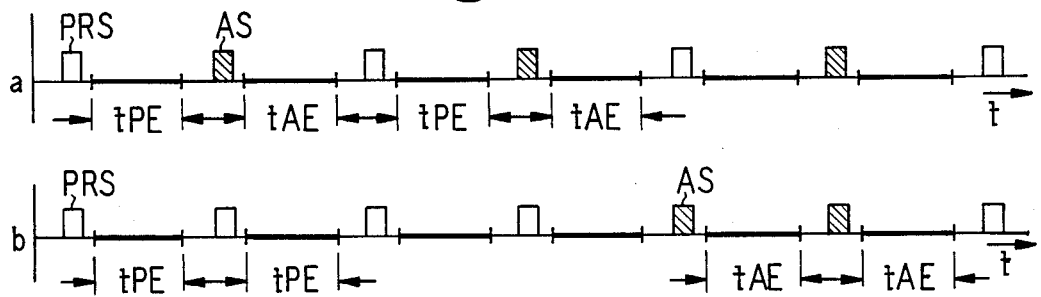
FIG. 5 shows a pulse-timing diagram for various types of interrogation.

In FIG. 5 in line "a" the time succession of the transmission of primary radar transmission signals PRS and interrogation signals AS is illustrated, whereby the latter are shaded. The transmission signals PRS which serve only as primary radar signals, and the interrogation signals AS which represent pure interrogation signals, succeed each other in line "a" with the same pulse repetition frequency, namely in such a way that one primary radar-transmission signal PRS and one interrogation signal AS are alternately transmitted. In the case that not so many interrogation signals AS are needed, e.g. after each third primary radar signal PRS, it would also be possible to transmit an interrogation signal AS. The reception periods in which the primary radar receiver 9 or 9a, respectively, is open, are identified with tPE, and the reception periods in which the answering signal-receiver 12 or 12a, respectively, is open are identified with tAE. Thereby, it is essential that the receiver for the answering signals is not overloaded by a transmission signal, e.g. for primary radar. This can be achieved by corresponding selection of time or in that the primary radar-transmission signal PRS and the interrogation signal AS always have different carrier frequencies, whereby the receivers are to be provided with corresponding filters. Decoupling by separate antennas is also possible.

In line "b" a distribution of the primary radar-transmission signals PRA and the interrogation AS is illustrated, which can advantageously be applied when the primary radar device operates with, in particular, coherent, Doppler evaluation. A series of only primary radar-transmission signals PRS follow each other here, namely so many as are needed for the Doppler evaluation (in consideration of the transient time of the filters). The primary radar-reception branch is then completely blocked for a longer period of time, and a succession of pure interrogation signals AS is transmitted which number is chosen in such a way that the desired answering probability is achieved. A succession of primary radar transmission signals PRS follows these interrogation signals anew, etc. The pulse distributions according to FIG. 5 are sensible only at those points where, as in FIG. 1 separate signals are provided for primary radar and interrogation.

Thereby, it is advisable to take care that with pivoted or rotating antennas at least each one succession of primary radar transmission signals PRS and interrogation signals AS is transmitted during the target sweeping time.

Figure 6:
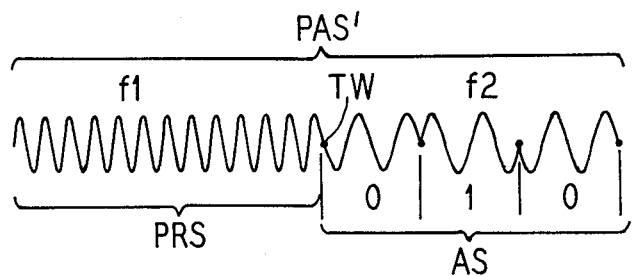
FIG. 6 shows the structure of a combined transmission signal, 2p

A combined primary radar interrogation signal PAS' is illustrated in FIG. 6. It consists of a first part PRS, which has a carrier frequency f1 and no modulation or coding. The first part solely serves for the execution of the passive position finding. The second part AS of the transmission signal which immediately follows the part PRS has a different carrier frequency f2 than the first part and is coded in conformity with the desired interrogation.

Figure 7:
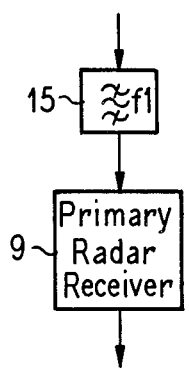
FIG. 7 shows the structure of part of the primary radar receiver for a transmission signal according to FIG. 6.
Figure 8:
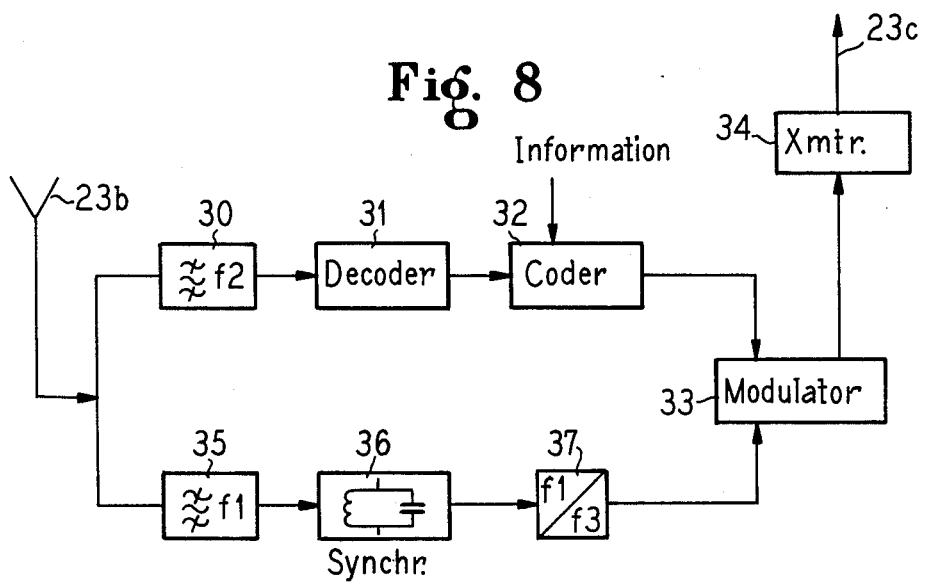
FIG. 8 shows the structure of an answering device for a transmission signal according to FIG. 6.

As it can be taken from FIG. 7, a band pass filter 15 is connected in this case ahead of the primary radar receiver 9 which lets only the passive echo signals having the frequency f1 traverse. By means of this, the primary radar receiver 9 can be opened already at a time TW (FIG. 6) at which the primary radar transmission signal PRS terminates. This is effected independent from the fact that subsequently the interrogation signal AS having the frequency f2 is transmitted. It is prevented in that a greater distance blind zone appears in the very short range due to too long of a dead time in the primary radar receiver. On the side of the answering station, the signal having the frequency f2, i.e. only the actual interrogation signal AS, which is received by antenna 23b (FIG. 8) is filtered out and supplied to a decoder 31. The coding of the answer signal takes place in a coder 32, to which, if necessary, corresponding information can be supplied which are to be transmitted to the interrogation station. The transmitter 34 of the answering station is controlled by a modulator 33 and the antenna 23c of the answering station radiates the signal back to antenna 11a in the interrogation station.

The utilization of the preceding transmitted signal PRS with the frequency f1 provides additional possibilities in the answering station to the effect that this frequency f1 is also used for the synchronization, or the like, in the answering station. For this, a filter 35 may be connected in a parallel to the filter 30 which lets only the frequency f1 traverse and which acts upon a generator 36, or the like, or upon a passive resonant circuit, synchronizing the latter. Great accuracies in the stability of frequency can be achieved by this. If necessary, a frequency converter 37 may be subsequently connected which converts the frequency f1 to another frequency f3, e.g. by multiplication or division. This frequency may be used, e.g., for the modulation or for the generation of the carrier signals.

Figure 9:
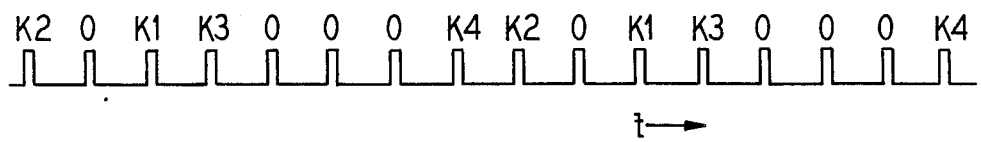
FIG. 9 shows a special transmission signal succession.

It may be possible in some cases, not to intend each transmission signal for both, identification and position finding, but to insert regularly or statistically only passive position finding signals (as it is similarly the case with present-day systems in which not every radar pulse also triggers an identifying signal in the independently operating IFF system, but only ever Kth pulse). Details pertaining to this are illustrated in FIG. 9. The percentage portion of transmitted signals K1 to K4 within the series of all signals serving for the identification and position finding, will be dependent on the directivity and rotational speed of the antenna or on the kind of antenna, respectively, (mechanical or electronic lobe scanning), and it will be dependent on the time available for the identification, etc. The signals which serve only for the passive position finding are identified with 0 and are preferably statistically distributed. They may have a coding which, however, can be distinguished by the answering stations by the coding of the K1, K2, K3, K4 interrogations and which thus do not initiate answer signals. However, the passive echo signals of the transmitted 0 signals can again be subjected to atuocorrelation.

The percentage portion of the K signals can be between 0% and 100% depending on the utilization and the radar device. If sections are alternatively transmitted with 0% and 100%, one receives a case which is similar to the "time-sharing" operation mentioned in FIG. 5, line b.

The alternate change between "0" and "K" described here is of particular importance when the identification is to be combined with a radar which, for ECCM-reasons, is frequency agile and which, e.g. changes the frequency from transmission period to transmission period. This agility may occur each time during the "0" period, while during the "K" period the frequencies which are possible for the identification are used. True, it is possible to attain a certain frequency agility also during the identification, however, only with greater difficulty.

A complete interrogation may also be formed from several partial interrogations. Thus, for example the interrogation signals K2, 0, K1, K3, 0, 0, 0, K4 altogether can form one interrogation, whereby in addition to the four basic interrogations, K2, K1, K3, K4, the inserted 0 signals also contribute to the crypto-keying, namely in the manner of a pulse-width modulation.

I claim:

1. An interrogation-answering system comprising:
   an interrogation station including a single radar transmitter for transmitting an interrogation signal and a coder connected to said transmitter for providing the interrogation signal with a certain code;
   an answering station including answer means responsive to said interrogation code to transmit answering signals having a certain answer code;
   a first receiver in said interrogation station for receiving said answering signal;
   an answer decoder connected to said first receiver to decode said answering signals;
   a second receiver in said interrogation station for receiving echo signals as a result of passive reflection of said interrogation from said answering station, including a correlator connected to said coder to receive a correlating function, to produce autocorrelation pulses for use in passive position finding of primary radar technique.

2. An interrogation-answering system to claim 1 comprising means for providing the interrogation signal to said transmitter as two partial signals, which can be distinguished in said second receiver, so that only the first partial signal is used for the passive position finding while the second partial signal serves as an interrogation signal.

3. An interrogation-answering system according to claim 2, comprising a source of different carrier frequencies wherein the division of the partial signals takes place by using different carrier frequencies and comprising band elimination filter means connected to the input of said second receiver for the frequency of the second portion of the transmission.

4. An interrogation-answering system according to claim 3, comprising means for starting the reception period of said second receiver immediately after the termination of the transmission of the first signal portion.

5. An interrogation-answering system according to claim 2, comprising means for adding additional information to the first signal portion for the transmission of such additional information to the answering station.

6. An interrogation-answering system according to claim 1, comprising means providing a multiplicity of individual interrogation signals which together form a complete interrogation.

7. An interrogation-answering system according to claim 6, comprising means for inserting the transmission signals which serve only for the passive position finding in a statistical succession between the basic interrogation signals.

8. An interrogation-answering system according to claim 1, comprising autocorrelation means at said answering station whereby the transmission of those signals serving only for passive position finding and distinguishable from basic interrogation signals by the kind of coding do not activate answering signals but are also subjected to autocorrelation.

9. The interrogation-answering system of claim 1, comprising:
   means for providing a multibit word for each bit of the coded interrogation signal;
   means for effecting autocorrelation for each of said code words; and
   a decoder for decoding the bit succession obtained from the last-mentioned means.

10. The interrogation-answering system of claim 9, comprising:
    means for providing all of the code words with the same bit length.

11. The interrogation-answering system of claim 10, comprising:
    means for exchanging "1" "0" to obtain code words representing "0's" from code words representing "1's"; and a common correlator for autocorrelation of both types of words.

12. The interrogation-answering system of claim 1, comprising:
    means for providing multibit word coding of the interrogation signals and thus of the passive echo signals; and
    a first correlator for autocorrelation of said code words.

13. The interrogation-answering system of claim 12, comprising:
    a second correlator connected to said first correlator for providing auto-correlation of the output of said first correlator.

14. The interrogation-answering system of claim 1, wherein said transmitter and said first and second receivers are mounted together as a unit.

15. The interrogation-answering system of claim 14, comprising a common antenna for transmission and reception of all signals between said interrogation and answering stations.

16. An interrogation-answering system comprising:
    a radar transmitter for transmitting radar signals toward a target;
    means for operating said transmitter alternately at first and second frequency signals as primary radar and interrogation signals respectively, including means for encoding interrogation information on the second frequency signal, the first frequency signal being passively reflected by the target as an echo signal;
    a transponder at the target responsive to the second frequency signal to transmit a certain answer siganl at the second frequency;
    first and second receivers for the echo and answer signals, respectively, and a blocking filter at the input of said first receiver to block signals of the second frequency; and
    transmission-reception control means operable to open reception immediately upon termination of transmission of the primary radar signal.

* * * * *